(12) United States Patent
Kriukov

(10) Patent No.: US 11,928,552 B2
(45) Date of Patent: Mar. 12, 2024

(54) LABEL, AS WELL AS A METHOD AND SYSTEM TO USE IT FOR AUTOMATED PRODUCT RECOGNITION

(71) Applicant: Pavel Nikolaevich Kriukov, Irkutskaya oblast (RU)

(72) Inventor: Pavel Nikolaevich Kriukov, Irkutskaya oblast (RU)

( * ) Notice: Subject to any disclaimer, the term of this patent is extended or adjusted under 35 U.S.C. 154(b) by 0 days.

(21) Appl. No.: 18/320,920

(22) Filed: May 19, 2023

(65) Prior Publication Data
US 2023/0289548 A1 Sep. 14, 2023

Related U.S. Application Data

(63) Continuation of application No. PCT/RU2022/050238, filed on Aug. 2, 2022.

(30) Foreign Application Priority Data

Nov. 24, 2021 (RU) .................................. 2021134241

(51) Int. Cl.
G06K 7/14 (2006.01)
G06K 7/10 (2006.01)

(52) U.S. Cl.
CPC ....... G06K 7/1491 (2013.01); G06K 7/10861 (2013.01)

(58) Field of Classification Search
CPC .................................. G06K 7/14; G06K 7/10
See application file for complete search history.

(56) References Cited

U.S. PATENT DOCUMENTS

| | | | | |
|---|---|---|---|---|
| 9,792,580 B1* | 10/2017 | Yan | .................... | G06K 7/10881 |
| 10,635,877 B2 | 4/2020 | Gao et al. | | |
| 11,376,508 B1* | 7/2022 | Linden | .................... | A63F 13/35 |
| 11,389,880 B2* | 7/2022 | Nishimiya | .............. | B23B 31/12 |
| 11,495,036 B1* | 11/2022 | Kündig | .............. | G06V 30/1448 |
| 11,734,640 B2* | 8/2023 | Simons | .............. | G06Q 10/0832 705/332 |
| 2016/0267494 A1* | 9/2016 | Pao | .................. | G06K 19/07758 |
| 2017/0300925 A1* | 10/2017 | Atkinson | ................ | G06F 3/147 |
| 2018/0005464 A1* | 1/2018 | Borucki | .................... | G07C 9/27 |
| 2021/0073496 A1 | 3/2021 | Gentile et al. | | |
| 2022/0130145 A1* | 4/2022 | Connary | ................ | G06V 20/10 |
| 2022/0211660 A1* | 7/2022 | Cave | .................... | A61K 9/0095 |
| 2022/0242160 A1* | 8/2022 | Gaathon | ................ | G07D 7/003 |
| 2022/0374874 A1* | 11/2022 | Irwin, Jr. | ........... | G06Q 20/3829 |

* cited by examiner

*Primary Examiner* — Thien M Le
(74) *Attorney, Agent, or Firm* — Nixon & Vanderhye PC

(57) ABSTRACT

The label, method, and system for automated recognition of products may be used at customer self-service checkouts, and for sorting products in automated warehouses. The label includes a base and a graphic code applied to the base that matches the ID of the product. The graphic code contains at least four areas located in the different parts of the label. Each area encodes a part of the ID and includes at least two graphic elements, one encoding at least one character of the ID, and the other encoding the position of such character in the ID. The product recognition system includes at least one scanning device and a data processing unit. The method of recognition includes scanning the label, receiving pictures or images of areas of the graphic code, recognizing the graphic elements of the code, decoding data, and determining the ID to identify the product.

20 Claims, 1 Drawing Sheet

LABEL, AS WELL AS A METHOD AND SYSTEM TO USE IT FOR AUTOMATED PRODUCT RECOGNITION

CROSS-REFERENCE TO RELATED APPLICATIONS

This application is the U.S. continuation of International Application No. PCT/RU2022/050238 filed Aug. 2, 2022 which designated the U.S. and claims priority to RU Patent Application No. 2021134241 filed Nov. 24, 2021, the entire contents of each of which are hereby incorporated by reference.

FIELD OF THE INVENTION

The group of inventions refers to the label, as well as a method and system to use such label for automated product recognition. The inventions may be used at customer self-service checkouts, as well as for sorting products in automated warehouses.

PRIOR ART

Self-service checkouts often use an automated product recognition system without any direct involvement of the customers or store employees. In such systems, the customer only puts the products on the checkout belt, and they are moved to the scanning zone where they are automatically recognized by scanning the graphic code applied to the product (bar code, QR-code, etc.) from different angles. For products sold by weight or those produced directly by the store, the graphic code is printed on a label that is affixed to the product packaging.

The automatic recognition of the graphic code is significantly hindered, if the label is bent or jammed, e.g. when it is affixed to a corner of the packaging or when the flexible packaging is deformed. In this case, the processing unit receives multiple separate pictures or images of the label, containing only parts of the graphic code. In this situation, the checkout data processing unit has to match these parts of the image to generate a single code that can identify the product.

The algorithms for "stitching" such parts of the graphic code are commonly known from the prior art. Specifically, such patent as U.S. Pat. No. 10,635,877 (Apr. 28, 2020) proposed a method for reading barcodes in automated product recognition that generates a set of barcode images affixed to the product, determines the 3D position of each label segment, and binds the segments together to read the barcode.

This method is fairly complicated and time-consuming. To speed up the recognition of the graphic code from multiple images of the label, it would be useful not to stitch the code images but rather to divide in advance the code into small areas that will encode parts of the ID number. Such areas can guarantee that they will be entirely scanned.

In view of this principle, the closest analog of the claimed group of inventions is the label as well as a method and system to use such label for automated product recognition, as disclosed in the US patent application 0152021073496 (Mar. 11, 2021). The label includes a base with applied graphic code divided into multiple physically separated areas. Each of these areas contains graphic elements that correspond to the characters of the product ID. In addition, the label has an augmented reality trigger in the form of a graphic element which, in addition to its visual functionality, can also specify the position of recognized characters in the ID.

When the label is read, the processing unit receives an image of the graphic code parts and uses the augmented reality trigger to match them in the proper sequence so that it can receive the ID. However, this analog uses the technique of dividing the graphic code into separate areas only for decorative purposes in order to "hide" the code in the label image. In addition, all graphic code areas are located in the central part of the label where the label may be bent or jammed, which prevents its use for automated product recognition. At the same time, using an augmented reality trigger to locate parts of the code is a complex and time-consuming process.

DISCLOSURE OF INVENTION

The main technical problem addressed by the discussed group of inventions is the complexity of automated product recognition with affixed labels when such labels are deformed (bent, twisted, jammed, etc.)

The technical result of this group of inventions is improved speed and accuracy of automated product recognition in cases when the label affixed on such product is bent or jammed.

This problem is addressed, and the technical result is achieved with the label affixed to the product for automated product recognition, when such label includes a base and graphic code applied to such base, and such graphic code matches the product ID and contains at least four areas, each of which encodes a part of the product ID. These areas are located in different parts of the label. Each of these areas includes at least two graphic elements, one of which encodes at least one character of the ID, and the other encodes the position of such character in the ID.

In addition, the particular implementations of the label include the following:
  The label base has a rectangular shape, and the areas of the graphic code are located in different corners of the base;
  The center between the graphic code areas contains an additional area with graphic elements designed to check the recognition of graphic elements of the graphic code areas or to restore these elements in one of the areas;
  The ID character is a digit or letter, and the graphic code element is an alphanumeric character, or an icon, or a set of dots, or a set of bars.

The above technical result is also achieved in the method of automated product recognition by scanning the label with at least one scanning device, and by obtaining the pictures or images of the graphic code areas from at least one scanning device, recognizing the graphic code elements in such areas on the pictures or images, by decoding the graphic element data, determining the product ID by substituting the characters in the corresponding ID positions based on the decoded data, and comparing the ID with the database in order to identify the product.

According to particular implementations of the method, each of the resulting pictures or images contains only part of the graphic code areas, and the label may be bent or crumpled when scanned.

The technical result is also achieved in the automated product recognition system, which includes at least one scanning device configured to automatically scan the labels and a data processing unit connected to the scanning device.

The data processing unit is configured to obtain the pictures or images of the graphic code areas from at least one scanning device, recognize the graphic code elements in such areas on the pictures or images, decode the graphic element data, determine the product ID by substituting the characters in the corresponding ID positions based on the decoded data, and compare the ID with the database in order to identify the product.

According to the particular implementation of the system, the scanning device may be a laser scanner, LED scanner, image scanner, photo camera, or video camera.

Unlike its analogs, the discussed group of inventions uses a label where the graphic code is divided into four areas located in different parts of the label. This ensures that, in practice, each of these areas can be recognized separately from different angles no matter how bent or crumpled is the label in any plane. At the same time, each of these areas contains not only the encoded value of the ID character, but also its position (digit) in the ID. When obtaining multiple pictures (images) of the label from different angles, this allows to easily determine the ID in automated mode by substituting the decoded characters in the appropriate position (digit) of the ID. Since each of the areas is small (and includes two graphic elements), this prevents recognizing only part of such area and eliminates the need for "stitching" various image fragments. This results in improved speed and accuracy of product recognition.

Figure 1:
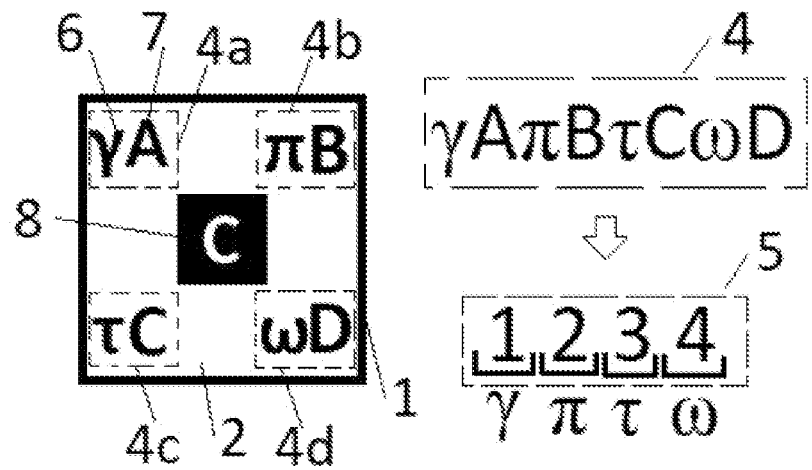
FIG. 1 presents a case of implementing the label based on the discussed invention.

The elements on the figures are designated by the following positions:
1—Label;
2—Label base;
3—Product;
4—Graphic code;
4a, 4b, 4c, 4d—Graphic code areas;
5—ID;
6—Graphic element that encodes the position of the ID character;
7—Graphic element that encodes the position of the ID character;
8—Additional area;
9—Scanning device;
10—Data processing unit.

EMBODIMENT OF THE INVENTION

The claimed label (1) includes a base (2), which may be affixed to the product (3) and a graphic code (4) which is applied to the base (1) and encrypts the product ID (5). Such graphic code (4) has at least four areas (4a,4b,4c,4d) located in different parts of the base (2) of the label (1). Preferably, the label base has a rectangular shape, while the areas (4a,4b,4c,4d) of the code (4) are located in the corners of the base (2).

Each of these areas (4a,4b,4c,4d) includes at least two graphic elements, one of which (7) encodes at least one character of the ID (5), and the other (6) encodes the position of such character in the ID (5). Graphic elements (6) and (7) may be, for example, the alphabetic characters from different alphabets, numbers, icons, a set of dots, bars, etc. Product ID (5) characters may be, for example, the letters and/or digits.

The example on FIG. 1 shows the product ID (5) in the form of a four-digit number. The graphic code (4) on the label (1) has such elements as "A", "B", "C" and "D" (7) encoding the digits "1", "2", "3" and "4" of the ID (5), respectively, and such elements as "γ", "π", "τ", "ω" (6) encoding the positions of these digits in the ID (5), i.e. the digit of the four-digit number, where "γ" corresponds to thousands, "π" corresponds to hundreds, "τ" corresponds to tens, and "ω" corresponds to ones. This example allows to specify 10,000 variants of the ID. If more variants are needed, more letters may be added to the ID and multiple ID (5) characters, such as two-digit numbers, can be encoded in one graphic element (7).

An additional graphic element (8) or several such elements can be placed between the areas (4a,4b,4c,4d) of the code (4) at the center of the label (1), which allows to correctly recognize the graphic elements (6,7) of the code (4) or restore the values of the elements (6,7) in one of the areas (4a,4b,4c,4d), for example, if part of the label (1) is damaged. An element (8) may be a symbol, icon, set of dots, bars, etc. This element (8) may, for example, encode a checksum of the elements (6,7) in the areas (4a,4b,4c,4d) in order to check the values or restore missing data.

Such elements are commonly used when recognizing the barcodes or QR codes and are well known to the experts.

The label (1)-based automated product recognition system (3) includes one or more scanning devices (9) and a data processing unit (10) connected to such devices. Scanning devices (9) may be laser scanners, LED scanners, image scanners (photo scanners), photo cameras, video cameras or a combination of such devices. The devices (9) allow to obtain pictures (image scanner, photo camera, or video camera) or images (laser scanner and LED scanner) of the label (1) from different angles. This may involve multiple devices (9) located at various points or a rotating device, or an omnidirectional device. The system may also include a scanning tunnel and a conveyor belt to move products (3) through such tunnel.

The data processing unit (10) may be a structurally single or distributed unit of several nodes. For example, the recognition functions may be performed by scanner hardware, which will be part of a distributed processing unit.

The method of product (3) recognition may be implemented as follows.

Figure 2:
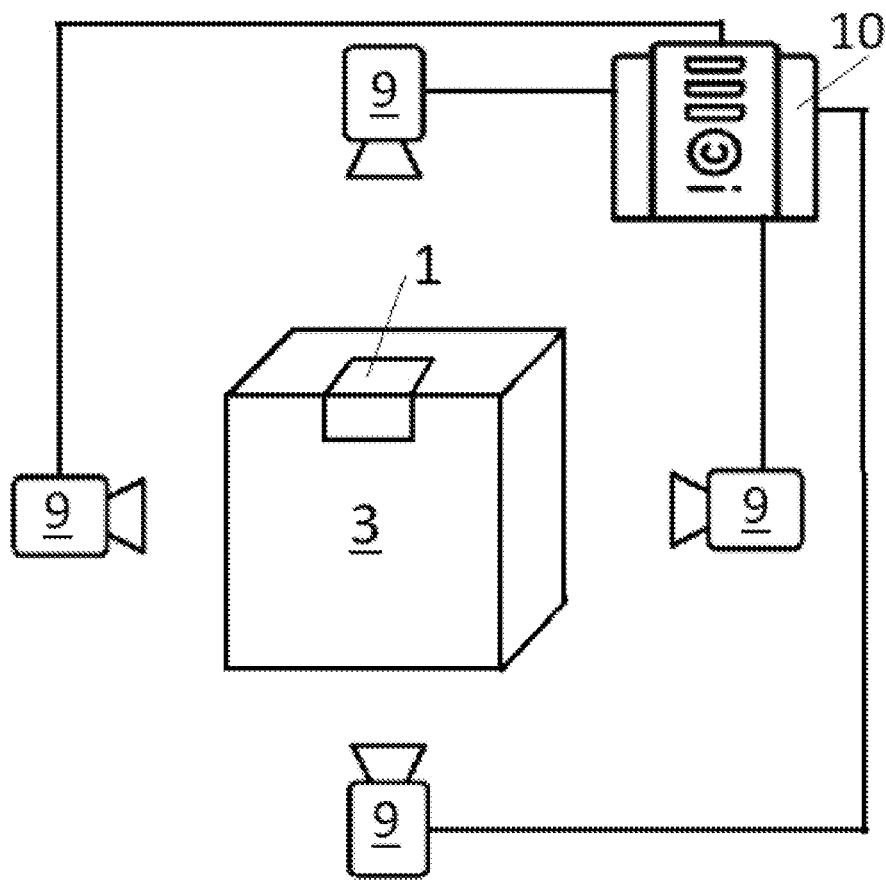
FIG. 2 shows the diagram of product recognition by using the label.

The product (3) is moving on the conveyor belt, and the label (1) affixed to the product enters the field of view of one or more scanning devices (9). It is then scanned, and the data processing unit (10) receives the pictures or images of areas (4a,4b,4c,4d) of the graphic code (4) of that label. If the label (1) is bent, as shown for example on FIG. 2, the different areas (4a,4b,4c,4d) of the code (4) are recognized from various scanning angles, i.e. each pictures or image contains only a part of the areas rather than all of them. Next, the unit (10) randomly recognizes the graphic elements (6,7) in each area (4a,4b,4c,4d) and decodes them by identifying the ID characters and their digits (receives the parts of ID (5)). The data processing unit (10) uses this data set to restore the correct sequence of ID (5) characters. Next, the unit (10) compares the ID with the database and identifies the specific product (3).

When needed, the unit (10) can use the scanning devices (9) to recognize the elements of the additional area (8) and check the correctness of the code (4) or restore the data value in one of the areas (4a,4b,4c,4d).

The invention claimed is:

1. A label affixed to a product for automated product recognition, the label comprising:
   a base and a graphic code that is applied to the base and matches an ID of the product (3);
   wherein the graphic code contains at least four areas, each of which encodes a part of the ID of the product; and wherein the areas are located in different parts of the label; and
   wherein each of the areas contains at least first and second graphic elements, the first graphic element encoding at least one ID character, and the second graphic element encoding a position of a specified character in the ID.

2. The label according to claim 1, wherein the base has a rectangular shape, and the areas of the graphic code are located in corners of the base.

3. The label according to claim 2, wherein a center of the label between the areas of the graphic code contains at least one further graphic element to check the recognition of the first and second graphic elements in the areas of the graphic code or to restore the first and second elements in one of the areas.

4. The label according to claim 1, wherein the ID is a digit or letter, and the first and second graphic elements of the graphic code include an alphanumeric character, an icon, a set of dots, or a set of bars.

5. A method of automated product recognition using the label of claim 1, the label being affixed to the product, the method comprising:
   Scanning the label using at least one scanner;
   Receiving from at least one scanner images or pictures of the areas of the graphic code;
   Recognizing the first and second graphic elements of the code in the areas from the images or pictures;
   Decoding data of the first and second graphic elements;
   Identifying the ID by substituting characters in corresponding positions of the ID based on the decoded data and comparing the ID with information from a database to identify the product.

6. The method according to claim 5, wherein each of the received images or pictures contains only part of the areas of the graphic code.

7. The method according to claim 6, wherein the label is bent or crumpled while being scanned.

8. A system for automated product recognition using the label according to claim 1, the system comprising:
   at least one scanner configured to enable the automated scanning of labels; and
   a processor connected to the at least one scanner, wherein the processor is configured to at least:
      receive images or pictures of the areas of the graphic code from the at least one scanner;
      recognize the first and second graphic elements of the code in the areas from the images or pictures;
      decode data of the first and second graphic elements;
      identify the ID of the product by substituting characters in corresponding positions of the ID based on decoded data and
      compare the ID with information from a database to identify the product.

9. The system according to claim 8, wherein the at least one scanner is a laser scanner, LED scanner, image scanner, photo camera, or video camera.

10. A method of automated product recognition using the label of claim 2, the label being affixed to the product, the method comprising:
    Scanning the label using at least one scanner;
    Receiving from at least one scanner images or pictures of the areas of the graphic code;
    Recognizing the first and second graphic elements of the code in the areas from the images or pictures;
    Decoding data of the first and second graphic elements;
    Identifying the ID by substituting characters in corresponding positions of the ID based on the decoded data and comparing the ID with information from a database to identify the product.

11. The method according to claim 10, wherein each of the received images or pictures contains only part of the areas of the graphic code.

12. The method according to claim 11, wherein the label is bent or crumpled while being scanned.

13. A method of automated product recognition using the label of claim 3, the label being affixed to the product, the method comprising:
    Scanning the label using at least one scanner;
    Receiving from at least one scanner images or pictures of the areas of the graphic code;
    Recognizing the first and second graphic elements of the code in the areas from the images or pictures;
    Decoding data of the first and second graphic elements;
    Identifying the ID by substituting characters in corresponding positions of the ID based on the decoded data and comparing the ID with information from a database to identify the product.

14. The method according to claim 13, wherein each of the received images or pictures contains only part of the areas of the graphic code.

15. The method according to claim 14, wherein the label is bent or crumpled while being scanned.

16. A method of automated product recognition using the label of claim 4, the label being affixed to the product, the method comprising:
    Scanning the label using at least one scanner;
    Receiving from at least one scanner images or pictures of the areas of the graphic code;
    Recognizing the first and second graphic elements of the code in the areas from the images or pictures;
    Decoding data of the first and second graphic elements;
    Identifying the ID by substituting characters in corresponding positions of the ID based on the decoded data and comparing the ID with information from a database to identify the product.

17. The method according to claim 16, wherein each of the received images or pictures contains only part of the areas of the graphic code.

18. The method according to claim 17, wherein the label is bent or crumpled while being scanned.

19. A system for automated product recognition using the label according to claim 2, the system comprising:
    at least one scanner configured to enable the automated scanning of labels; and
    a processor connected to the at least one scanner, wherein the processor is configured to at least:
    receive images or pictures of the areas of the graphic code from the at least one scanner;
    recognize the first and second graphic elements of the code in the areas from the images or pictures;
    decode data of the first and second graphic elements;
    identify the ID of the product by substituting characters in corresponding positions of the ID based on decoded data and
    compare the ID with information from a database to identify the product.

20. A system for automated product recognition using the label according to claim 3, the system comprising:
- at least one scanner configured to enable the automated scanning of labels; and
- a processor connected to the at least one scanner, wherein the processor is configured to at least:
- receive images or pictures of the areas of the graphic code from the at least one scanner;
- recognize the first and second graphic elements of the code in the areas from the images or pictures;
- decode data of the first and second graphic elements;
- identify the ID of the product by substituting characters in corresponding positions of the ID based on decoded data and
- compare the ID with information from a database to identify the product.

* * * * *